April 5, 1960     J. S. LOWERY     2,931,230
FOOD MEASURING DEVICE
Filed Feb. 10, 1956
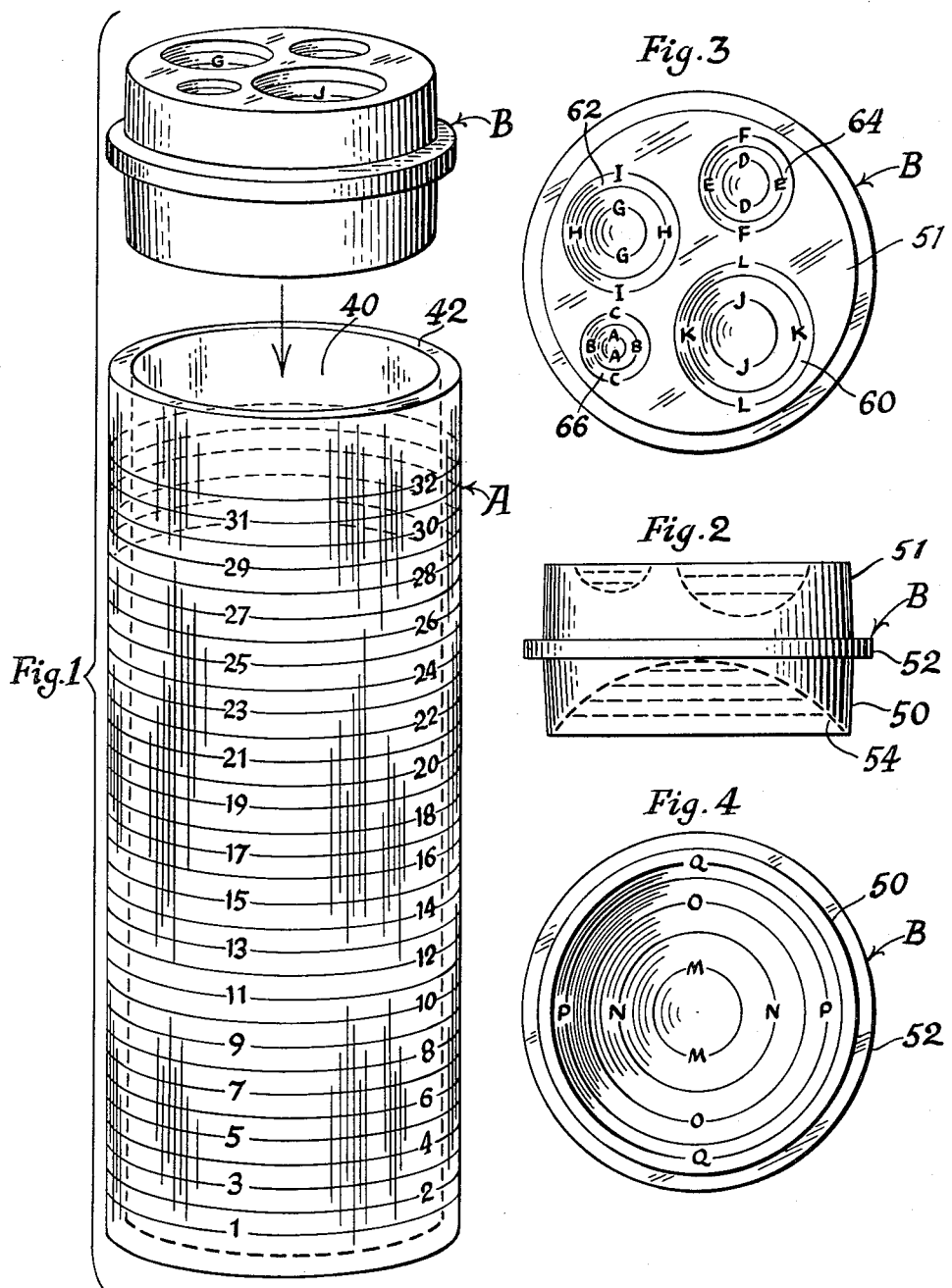
INVENTOR.
Joseph S. Lowery
BY
ATTORNEY

United States Patent Office 2,931,230
Patented Apr. 5, 1960

2,931,230

FOOD MEASURING DEVICE

Joseph S. Lowery, Philadelphia, Pa.

Application February 10, 1956, Serial No. 564,730

1 Claim. (Cl. 73—427)

My invention relates to a device for accurately measuring food and, more particularly, relates to a device for measuring quantities of food ingredients for multiple servings.

At the present time, standardized food measuring systems are at a minimum and the individual cook books themselves incorporate a wide variety of capacity and weight measurements as applying to even a single recipe. For example, food quantities are expressed in teaspoons, tablespoons, cups, dessertspoons, pounds, ounces, pinch, and multiples and fractions thereof. The housewife, not only has a problem in using a large number of measuring utensils, but also is subject to many errors in her reading of the measure to be used. Furthermore, the housewife is confronted with proportionally changing the total serving quantities, as when the recipe book indicates four servings and she desires to serve more or less people.

Thus, in the event fractional quantities are listed in the recipe, an arduous mathematical task is required in order to convert fractional parts to fractions of a greater or lesser demomination.

It is, therefore, an object of my invention to provide a device for measuring quantities of food ingredients wherein integral units of capacity measurements are employed to dispense with fractional quantities.

Another object of my invention is to provide a device for measuring quantities of food ingredients wherein conversion may easily be made to serve a greater or lesser number of people.

Another object of my invention is to construct a food measuring device for dispensing ingredients of a recipe without varying the unit of measurement.

Another object of my invention is to provide a food measuring device, integrally constructed with all of the compartments and graduations necessary to dispense food in all proportions without fractional numbers.

Other objects of my invention are to provide an improved device of the character described, that is easily and economically produced, which is sturdy in construction, and which is highly efficient in operation.

With the above and related objects in view, my invention consists of the details of construction and combination of parts, as will be more fully understood from the following description, when read in conjunction with the accompanying drawing, in which:

Fig. 1 is a perspective view of a food measuring device embodying my invention.

Fig. 2 is a side view of a cap with a plurality of compartments for measuring small quantities of food.

Fig. 3 is a top plan view of the cap.

Fig. 4 is a bottom plan view of the cap.

Referring now in greater detail to the drawing, in which similar reference characters refer to similar parts, I show a food measuring device embodying my invention comprising a body portion, generally designated as A, and a cap, generally designated as B.

The body portion A is a transparent cylindrical tumbler having a plurality of numbered graduation lines 1 to 32 etched or painted upon its exterior wall. Each numbered graduation line represents the volume of food, either liquid or solid particles, contained within the tumbler when level. The spacing between each pair of adjacent graduation lines includes equal increments of capacity. The cylindrical tumbler A has an open mouth 40 with a surrounding lip 42.

The cap B comprises plug portions 50 and 51, each of which fits snugly within the mouth 40 of the tumbler, and a flange 52 which overlies the lips 42. The plug portion 50 has a spherical concave surface 54 formed therein to define a compartment. A plurality of parallel circumscribed lines M, N, O, P, and Q are etched upon the concave surface 54. The capacity of the compartment contained within line Q is exactly one-half of the capacity between any two adjacent numbered lines on the body portion A. The space between two adjacent lines, as for example, between the center portion of surface 54 and line M, or between lines N and P, represents equal capacities. It is to be noted that the cap B is inverted when utilizing compartment 54.

The plug 51 has a plurality of spherically concave compartments 60, 62, 64, and 66 formed in its upper surface. The compartment 60 contains circumscribed lines J, K, and L; compartment 62 contains lines G, H, and I; compartment 64 has lines D, E, and F; and compartment 66 has circumscribed lines A, B, and C. Attention is invited to the fact that the volume contained between the concave surface of any compartment and a circumscribed line does not duplicate any volume within any other compartment or graduation increments of the tumbler A, but are, in reality, fractional denominations. It is to be further noted, as indicated hereinafter, that each of the capacity measurements are expressed in unitary values.

It is easily seen that the tumbler or body portion A, defines a holder for the cap B when either plug portion of the cap is inserted within the mouth 40 of the tumbler thereby enabling the opposite or upwardly extending plug portion to be used conveniently as a measuring device. In addition, the body portion A may be used to carry the cap B from place to place. Furthermore, the tumbler A may be efficiently utilized as a wash receptacle for the cap B when, for example, one or more compartments of the cap contains a viscous ingredient adhering therein. In such a case, the particular plug portion containing that compartment is simply inverted so as to act as a stopper for the tumbler and thereafter shaking the tumbler to leach the viscous ingredient from its compartment.

An example of the utility of my invention is easily seen from the following illustration. In the making of veal patties, a cook book shows a recipe to serve three persons as follows:

| | | |
|---|---|---|
| Ground veal | pounds | ¾ |
| Drippings | tablespoons | 2½ |
| Lemon juice | teaspoons | ¼ |
| Salt | do | ¼ |
| Paprika | do | ¼ |
| Nutmeg | do | ⅛ |
| Cornflakes | cup | ¼ |
| Shortening | tablespoons | 2⅓ |

The normal recipe book only gives quantities for a specific serving. In the event a housewife would desire to change the recipe to accommodate more or less persons, she would be required to make computations and arrive at results similar to those immediately below:

| 2 Servings | 4 servings |
|---|---|
| ½ lb. ground veal. | 1 lb. |
| 1¾ tablespoons drippings. | 3⅓ tablespoons. |
| ⅙ teaspoon lemon juice. | ⅓ teaspoon. |
| ⅙ teaspoon salt. | ⅓ teaspoon. |
| ⅙ teaspoon paprika. | ⅓ teaspoon. |
| ¹⁄₁₂ teaspoon nutmeg. | ⅙ teaspoon. |
| ⅙ cup cornflakes. | ⅓ cup. |
| 1⅚ tablespoons shortening. | 3⅙ tablespoons. |

| 6 servings | 8 Servings |
|---|---|
| 1½ lbs. ground veal. | 2 lbs. |
| 5 tablespoons drippings. | 6⅔ tablespoons. |
| ½ teaspoon lemon juice. | ⅔ teaspoon. |
| ½ teaspoon salt. | ⅔ teaspoon. |
| ½ teaspoon paprika. | ⅔ teaspoon. |
| ¼ teaspoon nutmeg. | ⅓ teaspoon. |
| ½ cup cornflakes. | ⅔ cup. |
| 4⅔ tablespoons shortening. | 6⅔ tablespoons. |

It is easily seen what confusion results both from the computation, the unitary capacity variations, and the reading of fractional values.

An example of the form of my measuring method is as follows:

|  | 2 servings | 3 servings | 4 servings | 6 servings | 8 servings |
|---|---|---|---|---|---|
| Ground veal _____ lb. | ½ | ¾ | 1 | 1½ | 2 |
| Drippings | MN | 2 LJ | P | 5 | 6M |
| Lemon juice | D | C | E | J | F |
| Salt | D | C | E | J | F |
| Paprika | D | C | E | J | F |
| Nutmeg | A | B | D | C | E |
| Cornflakes | QM | 4 | 5L | 8 | 10M |
| Shortening | JF | QL | 3E | 4M | 6F |

Each of the values set forth in the columns refer to a unitary value obtained from a measuring device such as described hereinbefore. No fractional values are expressed and the computations are already set forth for all serving portions.

Although my invention has been described in considerable detail, such description is intended as being illustrative rather than limiting, since the invention may be variously embodied, and the scope of the invention is to be determined as claimed.

I claim as my invention:

A food measuring device comprising a cap formed by oppositely disposed plug portions co-axially extending from a medial flange, a cylindrical tumbler defining a holder for said cap and being circumscribed with a plurality of spaced parallel lines on the cylindrical wall thereof, each of the plug portions of said cap having a substantially flat end wall and a tapered peripheral wall and selectively interfitting within the mouth of said tumbler, and a plurality of spherically concave compartments recessed in the end wall of each plug portion, each of said compartments having a plurality of spaced parallel lines circumscribed therein, the spacing between adjacent parallel lines being calibrated in equal increments of capacity, the increments of capacity of each compartment being designated in integer units whereby fractional arithmetic is avoided, and the increments of capacity of the respective compartments being different from each other but being fractionally related to the increment unit of measurement on said tumbler, said tumbler being adapted to carry said cap and to wash ingredients from the compartments thereof when used as a shaker.

References Cited in the file of this patent

UNITED STATES PATENTS

| D. 92,118 | Stuart | Apr. 24, 1934 |
| D. 172,482 | Smith | June 22, 1954 |
| 423,275 | Powell | Mar. 11, 1890 |
| 831,939 | Deming | Sept. 25, 1906 |
| 1,744,328 | Morley | Jan. 21, 1930 |
| 2,613,537 | Di Addario | Oct. 14, 1952 |
| 2,627,184 | Jones | Feb. 3, 1953 |

FOREIGN PATENTS

| 1,029,979 | France | Mar. 11, 1953 |